United States Patent
Tanaka et al.

(10) Patent No.: US 11,520,015 B2
(45) Date of Patent: Dec. 6, 2022

(54) 3-DIMENSIONAL MEASURING DEVICE

(71) Applicant: TOPCON CORPORATION, Tokyo (JP)

(72) Inventors: Yasushi Tanaka, Tokyo (JP); Takaaki Saito, Tokyo (JP); Ken'ichiro Yoshino, Tokyo (JP); Mitsuru Kanokogi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 1129 days.

(21) Appl. No.: 16/106,309

(22) Filed: Aug. 21, 2018

(65) Prior Publication Data

US 2019/0064326 A1 Feb. 28, 2019

(30) Foreign Application Priority Data

Aug. 24, 2017 (JP) .............................. JP2017-161303

(51) Int. Cl.
*G01S 7/481* (2006.01)
*G01S 7/497* (2006.01)
(Continued)

(52) U.S. Cl.
CPC .............. *G01S 7/4817* (2013.01); *G01J 3/108* (2013.01); *G01S 7/497* (2013.01); *G01S 17/10* (2013.01);
(Continued)

(58) Field of Classification Search
CPC ........ G01S 7/4817; G01S 7/497; G01S 17/10; G01S 17/42; G01S 17/89; G01S 7/4813; G01J 3/108; G01N 2201/0697
See application file for complete search history.

(56) References Cited

U.S. PATENT DOCUMENTS 5,949,530 A  9/1999 Wetteborn
5,991,011 A  11/1999 Damm
(Continued)

FOREIGN PATENT DOCUMENTS

DE  19607345 A1  8/1997
EP  3096110 A2  11/2016
(Continued)

OTHER PUBLICATIONS

Notice of Reasons for Refusal dated Jul. 7, 2021, in connection with Japanese Patent Application No. 2017-161303, 8 pgs. (including translation).

(Continued)

*Primary Examiner* — David P Porta
*Assistant Examiner* — Fani Polyzos Boosalis
(74) *Attorney, Agent, or Firm* — Chiesa Shahinian & Giantomasi PC (57) ABSTRACT

A 3-dimensional measuring device includes: a light source unit; a projection optical system; a scanning mirror that is provided to be rotatable about a rotating shaft in a state of being inclined with respect to a shaft center of the rotating shaft to radiate a range-finding light within a plane crossing the rotating shaft in a rotary manner; a light-receiving optical system that receives a reflection range-finding light; a reference light optical system that is provided in a range outside a measuring range within a radiation range to receive and reflect the range-finding light as an internal reference light, the reference light optical system being capable of changing a light quantity of the internal reference light; and a light receiving element that receives the reflection range-finding light and the internal reference light.

5 Claims, 6 Drawing Sheets

(51) Int. Cl.
  *G01J 3/10* (2006.01)
  *G01S 17/89* (2020.01)
  *G01S 17/10* (2020.01)
  *G01S 17/42* (2006.01)

(52) U.S. Cl.
  CPC .............. *G01S 17/42* (2013.01); *G01S 17/89* (2013.01); *G01N 2201/0697* (2013.01); *G01S 7/4813* (2013.01)

(56) References Cited

U.S. PATENT DOCUMENTS

| | | | |
|---|---|---|---|
| 6,252,655 B1 | 6/2001 | Tanaka | |
| 9,404,792 B2* | 8/2016 | Shimon | G02B 27/648 |
| 9,560,339 B2* | 1/2017 | Borowski | G01S 17/89 |
| 10,534,075 B2 | 1/2020 | Matsumoto et al. | |
| 10,724,853 B2* | 7/2020 | Bernstein | A61B 34/20 |
| 2011/0235018 A1 | 9/2011 | Mori et al. | |
| 2015/0309175 A1 | 10/2015 | Hinderling et al. | |

FOREIGN PATENT DOCUMENTS

| | | |
|---|---|---|
| EP | 3096110 A3 | 12/2016 |
| JP | H0829537 A | 2/1996 |
| JP | H10-020035 A | 1/1998 |
| JP | H10213661 A | 8/1998 |
| JP | 2007093306 A | 4/2007 |
| JP | 4024912 B2 | 12/2007 |
| JP | 2016-211873 A | 12/2016 |
| JP | 2017-015730 A | 1/2017 |

OTHER PUBLICATIONS

Extended Search Report dated Jan. 25, 2019, in connection with European Patent Application No. 18190024.2, 8 pgs.

Notice of Reasons for Refusal dated Aug. 3, 2022, in connection with Japanese Patent Application No. 2021-159482, 7 pgs. (including translation).

* cited by examiner

3-DIMENSIONAL MEASURING DEVICE

CROSS-REFERENCE TO RELATED APPLICATIONS

This application is based upon and claims benefit of priority from Japanese Patent Application No. 2017-161303, filed Aug. 24, 2017, the entire contents of which are incorporated herein by reference.

BACKGROUND OF THE INVENTION

The present invention relates to a 3-dimensional measuring device that radiates a range-finding light to a measurement target to measure a distance to the measurement target and detect a radiation direction of the range-finding light to thereby acquire 3-dimensional data on the measurement target.

Generally, a 3-dimensional measuring device that acquires 3-dimensional data (3-dimensional point cloud data) of a number of points of a measurement target is known. The 3-dimensional measuring device radiates pulsed laser beams to a measurement target as a range-finding light and receives a reflection light of each pulsed laser beam reflected from the measurement target. The 3-dimensional measuring device measures the distance to the measurement target on the basis of the received reflection light and an internal reference light and detects a radiation direction (a horizontal angle and a vertical angle) of the range-finding light to thereby acquire 3-dimensional data on the measurement target.

For example, an internal reference light is acquired by splitting a portion of a range-finding light emitted from a light emitting element using a beam splitter or the like, for example. In this case, it is necessary to perform a shutter switching operation of switching between an optical path for radiating a range-finding light to a measurement target and receiving a reflection light reflected from the measurement target using a light receiving element and an optical path for receiving a portion of the range-finding light split by a beam splitter or the like, for example, using a light receiving element as an internal reference light. However, a conventional shutter having an electronic mechanism (an actuator, a DC brush motor, and the like) cannot easily perform a high-speed switching operation due to its electrical characteristics and takes a considerable time in adjustment of its axis.

In contrast, Japanese Patent No. 4024912 discloses a laser range-finding device having a reference object disposed outside a monitored angular scanning range (a measuring region). In the laser range-finding device disclosed in Japanese Patent No. 4024912, a reference object is swept by a transmitted pulsed light. The transmitted pulsed light is reflected by the reference object. In this case, the energy of the transmitted pulsed light is attenuated by an attenuation filter provided in the reference object. In the laser range-finding device disclosed in Japanese Patent No. 4024912, since the reference object reflecting the transmitted pulsed light swept by the transmitted pulsed light is disposed outside a monitored angular scanning range, a switching operation of a shutter is not necessary.

However, in the laser range-finding device disclosed in Japanese Patent No. 4024912, the degree of attenuation of the energy of the transmitted pulsed light changes continuously in a scanning direction. Due to this, in order to change the degree of attenuation of energy of the transmitted pulsed light continuously, it is necessary to secure a relatively wide scanning range. However, in this case, there is a problem that the monitored angular scanning range (the measuring region) narrows.

SUMMARY OF THE INVENTION

The present invention has been made to solve the above-described problems and an object thereof is to provide a 3-dimensional measuring device capable of eliminating a shutter's switching operation and securing a relative wide measuring range.

According to the present invention, the above problems are solved by a 3-dimensional measuring device that radiates a range-finding light to a measurement target, measures a distance to the measurement target on the basis of an internal reference light and a reflection range-finding light, which is the range-finding light reflected from the measurement target, and detects a radiation direction of the range-finding light to thereby acquire 3-dimensional data on the measurement target, the 3-dimensional measuring device including: a light source unit that emits the range-finding light; a projection optical system that radiates the range-finding light emitted from the light source unit to a range-finding optical axis; a scanning mirror that is provided to be rotatable about a rotating shaft in a state of being inclined with respect to a shaft center of the rotating shaft to radiate the range-finding light guided from the projection optical system within a plane crossing the rotating shaft in a rotary manner; a light-receiving optical system that receives the reflection range-finding light having been reflected from the measurement target and guided by the scanning mirror; a reference light optical system that is provided in a range outside a measuring range, in which the measurement target is irradiated with the range-finding light within a radiation range in which the range-finding light is radiated by the scanning mirror in a rotary manner, to receive and reflect the range-finding light, reflected from the scanning mirror, as the internal reference light, this reference light optical system being capable of changing a light quantity of the reflected internal reference light; and a light receiving element that receives the reflection range-finding light and the internal reference light guided from the reference light optical system.

According to this configuration, the reference light optical system that receives the range-finding light reflected from the scanning mirror as the internal reference light and reflects the internal reference light is provided in a range outside the measuring range within the radiation range of the range-finding light. The radiation range is a range in which the range-finding light is radiated to the scanning mirror in a rotary manner. The measuring range is a range in which the range-finding light is radiated to the measurement target. In this manner, since the reference light optical system is provided in a range outside the measuring range within the radiation range, it is not necessary to provide a shutter that switches between an optical path for radiating the range-finding light to the measurement target and receiving the reflection light reflected from the measurement target using the light receiving element and an optical path for receiving a portion of the range-finding light split by an optical member using the light receiving element as the internal reference light. Due to this, it is possible to eliminate a shutter's switching operation.

Moreover, the reference light optical system can change the light quantity of the reflected internal reference light. That is, the light quantity of the internal reference light does not change depending on a radiation direction (a scanning direction) of the range-finding light but can be changed by the reference light optical system. Due to this, it is possible to acquire internal reference light having different light quantities using the reference light optical system while suppressing a radiation range (a scanning range) of the range-finding light for acquiring the internal reference light. In this way, it is possible to suppress the measuring range from narrowing and to secure a relatively wide measuring range.

Preferably, the reference light optical system includes a density variable filter capable of changing an optical density of a region through which the internal reference light passes and a reflecting sheet of retroreflection that reflects the internal reference light having passed through the density variable filter.

According to this configuration, the reference light optical system has a density variable filter. The density variable filter can change the optical density of a region through which the internal reference light passes. Due to this, the transmittance of the internal reference light with respect to the density variable filter is variable. Due to this, it is possible to acquire internal reference lights having different light quantities using the reference light optical system while suppressing a radiation range (a scanning range) of the range-finding light for acquiring the internal reference light. In this way, it is possible to suppress the measuring range from narrowing and to secure a relatively wide measuring range. Moreover, the reference light optical system has a reflecting sheet. The reflecting sheet causes retroreflection of the internal reference light having passed through the density variable filter. In this way, adjustment of an optical axis is not necessary unlike a case in which a prism or a mirror reflects the internal reference light. Due to this, it is possible to eliminate the time and effort taken in adjustment of an optical axis.

Preferably, the reference light optical system further includes a motor that generates rotating force, and the density variable filter is a density gradient filter which is provided to be rotatable with the rotating force transmitted from the motor and in which the optical density changes in a circumferential direction.

According to this configuration, the density variable filter is a density gradient filter in which the optical density changes in the circumferential direction. The density variable filter is provided to be rotatable with the rotating force transmitted from the motor. Due to this, when the density variable filter rotates, the optical density of a region through which the internal reference light passes changes. When the density variable filter in which a gradient of the optical density is provided rotates, it is possible to acquire the internal reference lights having different light quantities while suppressing the radiation range (the scanning range) of the range-finding light for acquiring the internal reference light. In this way, it is possible to suppress the measuring range from narrowing and to secure a relatively wide measuring range.

Preferably, the reference light optical system includes a transmittance variable filter capable of changing a transmittance of the internal reference light and a reflecting sheet of retroreflection that reflects the internal reference light having passed through the transmittance variable filter.

According to this configuration, the reference light optical system has a transmittance variable filter. The transmittance variable filter can change the transmittance of the internal reference light. That is, the transmittance of the internal reference light with respect to the transmittance variable filter is variable. Due to this, it is possible to acquire internal reference lights having different light quantities using the reference light optical system while suppressing a radiation range (a scanning range) of the range-finding light for acquiring the internal reference light. In this way, it is possible to suppress the measuring range from narrowing and to secure a relatively wide measuring range. Moreover, the reference light optical system has a reflecting sheet. The reflecting sheet causes retroreflection of the internal reference light having passed through the density variable filter. In this way, adjustment of an optical axis is not necessary unlike a case in which a prism or a mirror reflects the internal reference light. Due to this, it is possible to eliminate the time and effort taken in adjustment of an optical axis.

Preferably, the reference light optical system includes a motor that generates rotating force and a reflectance gradient sheet which is provided to be rotatable with the rotating force transmitted from the motor and in which a reflectance of the internal reference light changes in a circumferential direction.

According to this configuration, the reference light optical system includes the reflectance gradient sheet in which the reflectance of the internal reference light changes in the circumferential direction. The reflectance gradient sheet is provided to be rotatable with the rotating force transmitted from the motor. Due to this, when the reflectance gradient sheet rotates, the reflectance of the internal reference light reflected from the reflectance gradient sheet changes. Due to this, it is possible to acquire the internal reference lights having different light quantities while suppressing the radiation range (the scanning range) of the range-finding light for acquiring the internal reference light. In this way, it is possible to suppress the measuring range from narrowing and to secure a relatively wide measuring range.

According to the present invention, it is possible to provide a 3-dimensional measuring device capable of eliminating a shutter's switching operation and securing a relative wide measuring range.

DESCRIPTION OF THE PREFERRED EMBODIMENT

Hereinafter, a preferred embodiment of the present invention will be described in detail with reference to the drawings. The embodiment to be described below is a preferred specific example of the present invention, and thus, the embodiment is accompanied by various preferable technical limitations. It is noted that the scope of the present invention is not limited to the embodiment unless the following description explicitly limits the invention. In the drawings, similar constituent elements will be denoted by the same reference numerals, and the detailed description thereof will be omitted appropriately.

Figure 1:
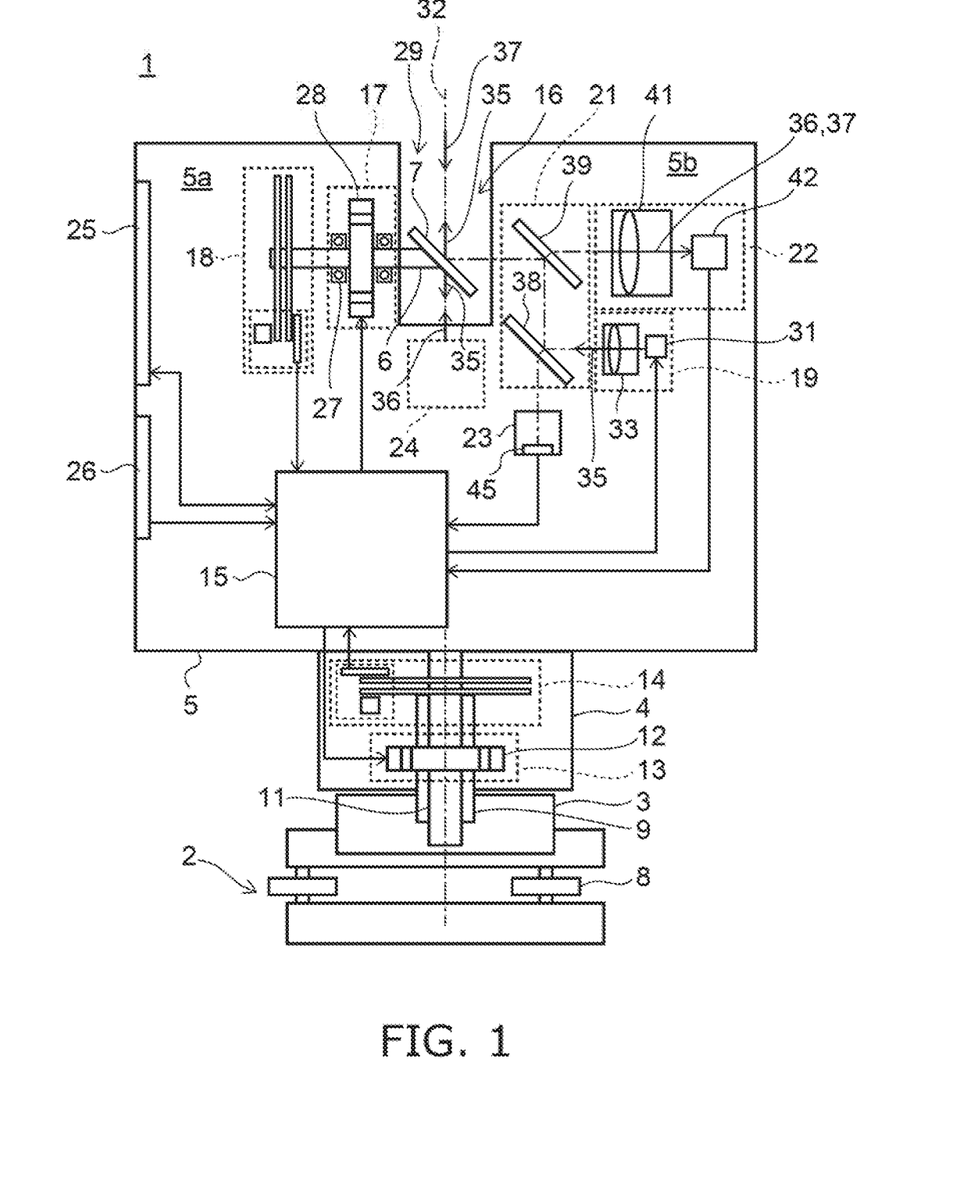
FIG. 1 is a block diagram illustrating a 3-dimensional measuring device according to an embodiment of the present invention.

FIG. 1 is a block diagram illustrating a 3-dimensional measuring device according to an embodiment of the present invention. In the description of the present embodiment, a case in which the 3-dimensional measuring device is a 3-dimensional laser scanner will be described.

As illustrated in FIG. 1, a 3-dimensional measuring device 1 includes a leveling portion 2 attached to a tripod (not illustrated), a base portion 3 provided on the leveling portion 2, a table portion 5 provided on the base portion 3 with a horizontal rotating portion 4 disposed therebetween so as to be rotatable in a horizontal direction, and a scanning mirror 7 provided on the table portion 5 so as to be rotatable in a vertical direction (a height direction) about a vertical rotating shaft 6.

The leveling portion 2 has three adjustment screws 8, for example. Leveling of the leveling portion 2 is performed when the adjustment screws 8 are adjusted so that an inclination sensor (not illustrated) provided in the table portion 5 detects a horizontal state.

The horizontal rotating portion 4 has a horizontal rotating shaft 11 rotatably provided on the base portion 3 with a bearing 9 disposed therebetween and supported vertically. The table portion 5 is supported by the horizontal rotating shaft 11 and rotates integrally with the horizontal rotating shaft 11.

A horizontal driving portion 13 including a horizontal driving motor 12 and a horizontal angle detector (for example, an encoder) 14 that detects a rotation angle of the horizontal rotating shaft 11 are accommodated in the horizontal rotating portion 4. The table portion 5 rotates about the horizontal rotating shaft 11 with driving force transmitted from the horizontal driving motor 12. A rotation angle of the horizontal rotating shaft 11 in relation to the base portion 3 (that is, a rotation angle of the table portion 5) is detected by the horizontal angle detector 14.

A detection result (a horizontal angle) of the horizontal angle detector 14 is input to the control operation unit 15. Driving of the horizontal driving motor 12 is controlled by the control operation unit 15 on the basis of the detection result of the horizontal angle detector 14.

A concave portion 16 is formed in a central portion of the table portion 5. A first chamber 5a and a second chamber 5b are formed on both sides of the concave portion 16. A vertical driving portion 17 and a vertical angle detector 18 are accommodated in the first chamber 5a (the chamber on the left side in FIG. 1). A range-finding light emitter 19, a common optical path 21, a range finding unit 22, an imaging unit 23, and a reference light optical system 24 are accommodated in the second chamber 5b (the chamber on the right side in FIG. 1). The control operation unit 15 is accommodated at a predetermined position inside the table portion 5. Moreover, a display unit 25 and an operating unit 26 are provided in a predetermined portion of the table portion 5.

The vertical rotating shaft 6 has a shaft center extending horizontally and is rotatably supported on the table portion 5 with a bearing 27 disposed therebetween. One end of the vertical rotating shaft 6 protrudes toward the concave portion 16. The scanning mirror 7 is provided in one end of the vertical rotating shaft 6 protruding toward the concave portion 16 and is inclined at an angle of 45° with respect to the shaft center of the vertical rotating shaft 6. The scanning mirror 7 is supported inside the concave portion 16 by the vertical rotating shaft 6 and can rotate in a vertical direction about the vertical rotating shaft 6.

The vertical driving portion 17 has a vertical driving motor 28 that rotates the vertical rotating shaft 6. The scanning mirror 7 rotates with driving force transmitted from the vertical driving motor 28 via the vertical rotating shaft 6. The scanning unit 29 of the present embodiment has the vertical rotating shaft 6, the scanning mirror 7, and the vertical driving motor 28.

A vertical angle detector 18 (for example, an incremental encoder) is provided at the other end of the vertical rotating shaft 6. The rotation angle of the vertical rotating shaft 6 in relation to the table portion 5 is detected by the vertical angle detector 18. The detection result (a vertical angle) of the vertical angle detector 18 is input to the control operation unit 15. Driving of the vertical driving motor 28 is controlled by the control operation unit 15 on the basis of a detection result of the vertical angle detector 18.

The range-finding light emitter 19 has a range-finding light source unit 31 and a projection optical system 33 including an objective lens and the like. The range-finding light source unit 31 is a semiconductor laser or the like, for example, and emits a range-finding light 35 to a range-finding optical axis 32. The range-finding light 35 of the present embodiment is an infrared pulsed laser beam as an invisible light. The range-finding light source unit 31 is controlled by the control operation unit 15 and emits a pulsed light in a predetermined state including a predetermined light intensity, a predetermined pulse interval, and the like.

The common optical path 21 has a first beam splitter 38 and a second beam splitter 39. The range finding unit 22 has a light-receiving optical system 41 including a condensing lens and the like and a light receiving element 42. The light receiving element 42 receives a reflection range-finding light 37 which is the range-finding light 35 reflected from a measurement target (not illustrated) and which has passed through the light-receiving optical system 41 and converts the reflection range-finding light 37 to an electrical signal. Moreover, the light receiving element 42 receives an internal reference light 36 guided from the reference light optical system 24 and converts the internal reference light 36 to an electrical signal.

That is, the range-finding light 35 output from the range-finding light source unit 31 is guided to the common optical path 21 via the projection optical system 33. The range-finding light 35 guided to the common optical path 21 is sequentially reflected from the first beam splitter 38 and the second beam splitter 39 and is then guided to the scanning mirror 7. The range-finding light 35 having passed through the first beam splitter 38 and the second beam splitter 39 is absorbed by a reflection preventing member (not illustrated).

The scanning mirror 7 is a deflection optical member and reflects the range-finding light 35 incident from a horizontal direction at a right angle. Moreover, the scanning mirror 7 reflects the reflection range-finding light 37 and the internal reference light 36 incident on the scanning mirror 7 toward the second beam splitter 39 in a horizontal direction.

The range-finding light 35 guided from the common optical path 21 toward the scanning mirror 7 is reflected from the scanning mirror 7 and is radiated to the measurement target. Moreover, the range-finding light 35 guided from the common optical path 21 toward the scanning mirror 7 is reflected from the scanning mirror 7 and is radiated to the reference light optical system 24 as the internal reference light 36. That is, in a measuring range within a radiation range of the range-finding light 35, the range-finding light 35 is reflected from the scanning mirror 7 and is radiated to the measurement target. On the other hand, in a range outside the measuring range within the radiation range of the range-finding light 35, the range-finding light 35 is reflected from the scanning mirror 7 and is received and reflected by the reference light optical system 24 as the internal reference light 36. That is, the reference light optical system 24 is provided in a range outside the measuring range within the radiation range of the range-finding light 35. The internal reference light 36 is light which is a portion of the range-finding light 35 and is light received by the reference light optical system 24. The "radiation range" in the present application is a range in which the range-finding light 35 is radiated by the scanning mirror 7 in a rotary manner. Moreover, the "measuring range" is a range in which the range-finding light 35 is radiated to the measurement target.

When the scanning mirror 7 rotates about the vertical rotating shaft 6, the range-finding light 35 is radiated in a plane (a vertical plane in the present embodiment) crossing the vertical rotating shaft 6 in a rotary manner. Moreover, when the table portion 5 is rotated by the horizontal rotating portion 4 in a horizontal direction, the range-finding light 35 is radiated in a rotary manner in a horizontal direction about the horizontal rotating shaft 11. Therefore, by cooperation of the rotation in the vertical direction of the scanning mirror 7 and rotation in the horizontal direction of the table portion 5, the 3-dimensional measuring device 1 can scan the entire measuring range with the range-finding light 35.

The reflection range-finding light 37 reflected from the measurement target present in the measuring range is incident on the scanning mirror 7. The reflection range-finding light 37 incident on the scanning mirror 7 is reflected from the scanning mirror 7 and is incident on the common optical path 21. The reflection range-finding light 37 passes through the second beam splitter 39 and is guided to the range finding unit 22. Moreover, the internal reference light 36 reflected from the reference light optical system 24 provided in a range outside the measuring range is incident on the scanning mirror 7. The internal reference light 36 incident on the scanning mirror 7 is reflected from the scanning mirror 7 and is incident on the common optical path 21. The internal reference light 36 passes through the second beam splitter 39 and is guided to the range finding unit 22.

The light receiving element 42 of the range finding unit 22 receives, via the light-receiving optical system 41, the reflection range-finding light 37 reflected from the measurement target and the internal reference light 36 reflected from the reference light optical system 24. In the light receiving element 42, the reflection range-finding light 37 and the internal reference light 36 are converted to an electrical signal of the reflection range-finding light and an electrical signal of the internal reference light, respectively, and are transmitted to the control operation unit 15. The distance to the measurement target is measured on the basis of a difference in time interval between the reflection range-finding light electrical signal and the electrical signal of the internal reference light.

The control operation unit 15 calculates a coordinate value of the measurement target on the basis of the measured distance to the measurement target, the vertical angle detected by the vertical angle detector 18, and the horizontal angle detected by the horizontal angle detector 14. Moreover, the control operation unit 15 can obtain point cloud data on the entire measuring range or point cloud data on the measurement target by recording the coordinate value of the measurement target for respective pulsed lights. An angle detecting unit that detects the direction of the range-finding optical axis 32 includes the horizontal angle detector 14 and the vertical angle detector 18. That is, the radiation direction of the range-finding light 35 is detected by the angle detecting unit including the horizontal angle detector 14 and the vertical angle detector 18.

The imaging element 45 is provided on an imaging optical axis of the imaging unit 23. The imaging element 45 has a pixel assembly and outputs a digital image signal. Examples of the imaging element 45 include a CCD or CMOS sensor, for example. The positions in the imaging element 45, of the respective pixels of the imaging element 45 can be specified.

Figure 2:
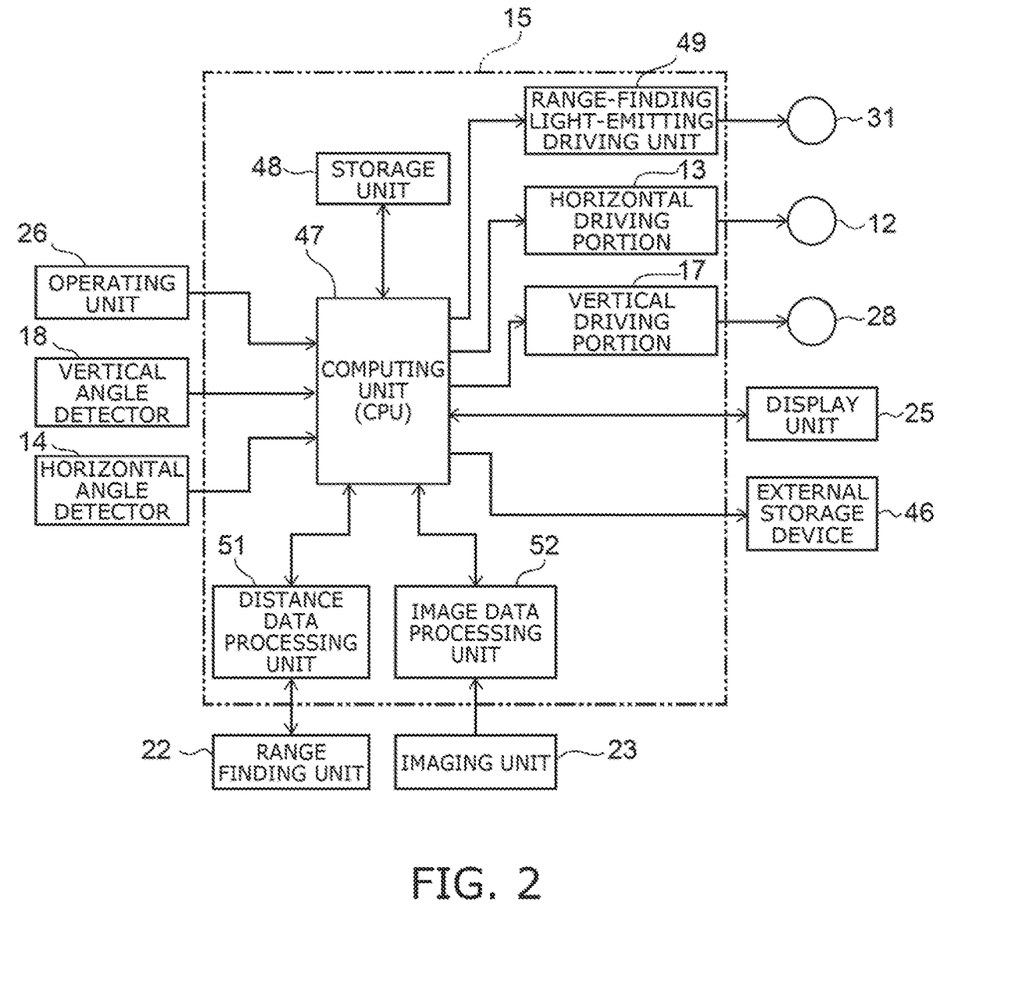
FIG. 2 is a block diagram illustrating a control system of the 3-dimensional measuring device according to the present embodiment.

FIG. 2 is a block diagram illustrating a control system of the 3-dimensional measuring device according to the present embodiment. The operating unit 26, the vertical angle detector 18, and the horizontal angle detector 14 are electrically connected to the control operation unit 15. Angle detection signals output respectively from the vertical angle detector 18 and the horizontal angle detector 14 are input to the control operation unit 15 and an operation signal output from the operating unit 26 on the basis of an operator's operation is also input to the control operation unit 15.

An operator operates the operating unit 26 to set conditions necessary for starting the measurement of the 3-dimensional measuring device 1. Examples of the necessary conditions include a measuring range, a point cloud data density (pitch), and imaging conditions. The set conditions and the like input by the operating unit 26 are displayed on the display unit 25. In this way, an operator can ascertain the set conditions and the like input by the operating unit 26 on the display unit 25. The operating unit 26 and the display unit 25 may be provided in the table portion 5 and may be provided independently from the table portion 5 and may be remote-controlled by a signal transmission medium such as radio waves or infrared rays.

The control operation unit 15 drives the range-finding light source unit 31, the horizontal driving motor 12, and the vertical driving motor 28 and controls the display unit 25 that displays an operation state, a measurement result, and the like. Moreover, an external storage device 46 such as a memory card or a HDD is provided in the control operation unit 15. The external storage device 46 may be fixedly provided in the control operation unit 15 and may be detachably provided.

The control operation unit 15 includes a computing unit 47 represented by a CPU, a storage unit 48, a range-finding light-emitting driving unit 49 that controls light emission of the range-finding light source unit 31, the horizontal driving portion 13 that drives and controls the horizontal driving motor 12, and the vertical driving portion 17 that drives and controls the vertical driving motor 28. Moreover, the control operation unit 15 includes a distance data processing unit 51 that processes distance data obtained by the range finding unit 22 and an image data processing unit 52 that processes image data obtained by the imaging unit 23.

The storage unit 48 stores programs such as a sequence program for executing range-finding, measurement of a vertical angle, and measurement of a horizontal angle, a computation program for performing computation of range-finding, a measurement data processing program for executing processing of measurement data, an imaging program for controlling an imaging state of the imaging unit 23, an image processing program for executing image processing, and an image display program for causing the display unit 25 to display data or a program or the like for managing these programs in an integrated manner. Moreover, the storage unit 48 stores data such as measurement data and image data.

The computing unit 47 may have the function of the distance data processing unit 51 and the function of the image data processing unit 52. In this case, the distance data processing unit 51 and the image data processing unit 52 may not necessarily be provided.

The distance data processing unit 51 and the image data processing unit 52 may be provided separately from the control operation unit 15. For example, another PC other than the control operation unit 15 may execute the functions of the distance data processing unit 51 and the image data processing unit 52. In this case, for example, distance data and image data are transmitted from the 3-dimensional measuring device 1 to a PC via communication means provided in the 3-dimensional measuring device 1 and the PC. The PC executes distance data processing and image data processing. Example of the communication means include optical communication, radio communication, LAN, and the like.

Figure 3:
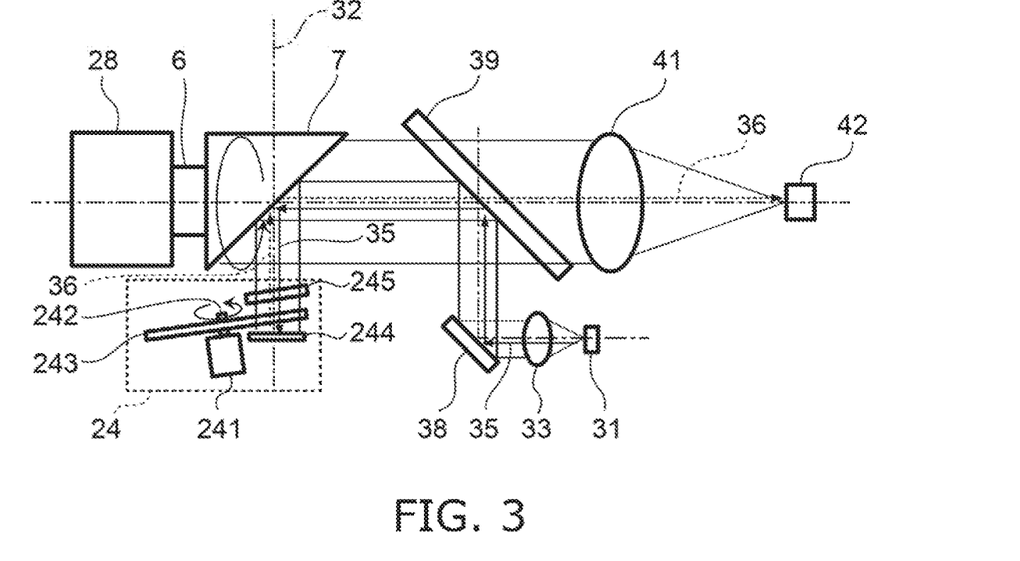
FIG. 3 is a diagram illustrating a reference light optical system of the present embodiment.
Figure 4:
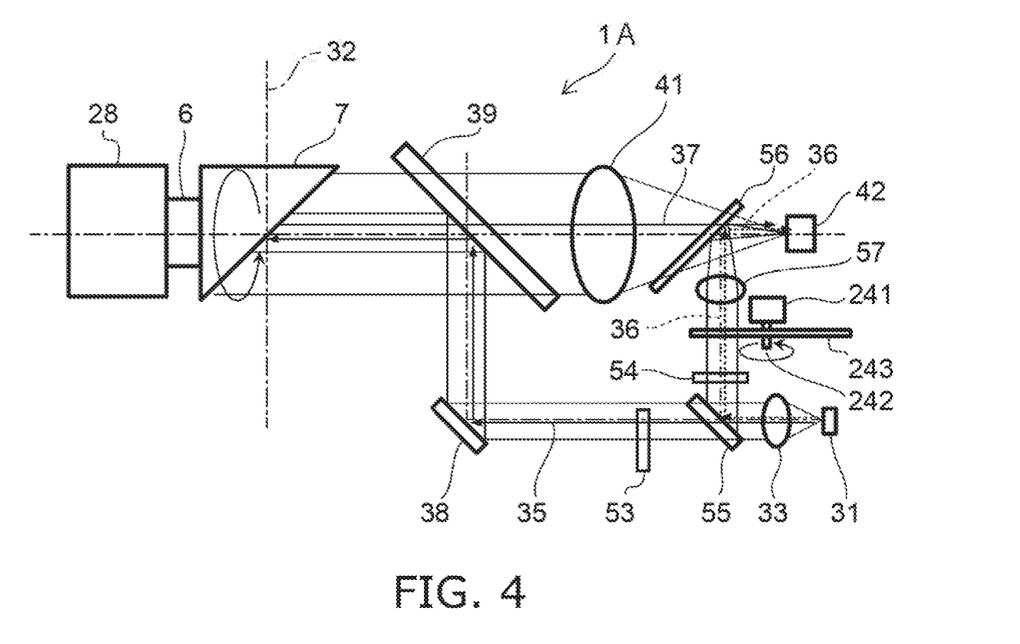
FIG. 4 is a diagram illustrating a 3-dimensional measuring device according to a comparative example of the present embodiment.

FIG. 3 is a diagram illustrating the reference light optical system according to the present embodiment. FIG. 4 is a diagram illustrating a 3-dimensional measuring device according to a comparative example of the present embodiment. The imaging unit 23 is omitted in FIG. 3 for the sake of convenience. The same is true in FIGS. 7 and 8.

First, a 3-dimensional measuring device 1A according to a comparative example of the present embodiment will be described with reference to FIG. 4. In the 3-dimensional measuring device 1A according to this comparative example illustrated in FIG. 4, a third beam splitter 55 and a first shutter 53 are provided between the projection optical system 33 and the first beam splitter 38. The third beam splitter 55 and the first shutter 53 are arranged in that order from the projection optical system 33 toward the first beam splitter 38.

A fourth beam splitter 56 is provided between the light-receiving optical system 41 and the light receiving element 42. Furthermore, a second shutter 54, a density gradient filter 243, and a lens 57 are provided between the third beam splitter 55 and the fourth beam splitter 56. The second shutter 54, the density gradient filter 243, and the lens 57 are arranged in that order from the third beam splitter 55 toward the fourth beam splitter 56.

The first and second shutters 53 and 54 each can adjust transmittance of light. That is, the first and second shutters 53 and 54 each can transmit light by opening the shutter and block light by closing the shutter. When the first shutter 53 is open, the range-finding light 35 output from the range-finding light source unit 31 passes through the third beam splitter 55 and the first shutter 53 and is reflected sequentially from the first beam splitter 38 and the second beam splitter 39 and is guided to the scanning mirror 7.

On the other hand, when the second shutter 54 is open, a portion of the range-finding light 35 output from the range-finding light source unit 31 is reflected from the third beam splitter 55 and passes through the second shutter 54 as the internal reference light 36. The internal reference light 36 which has been reflected from the third beam splitter 55 and has passed through the second shutter 54 passes through the density gradient filter 243 and the lens 57 and is guided toward the fourth beam splitter 56. The internal reference light 36 guided to the fourth beam splitter 56 is reflected from the fourth beam splitter 56 and is received by the light receiving element 42.

The density gradient filter 243 is supported by a shaft 242 of the motor 241 and is provided rotatable about the shaft 242 of the motor 241 with the rotating force transmitted from the motor 241. An optical density of the density gradient filter 243 changes in a circumferential direction. Due to this, when the density gradient filter 243 rotates, an optical density of a region in which the internal reference light 36 passes through the density gradient filter 243 changes. In this way, internal reference lights 36 having different light quantities are guided to the fourth beam splitter 56. The other constituent elements are similar to the constituent elements of the 3-dimensional measuring device 1 described in FIG. 1.

In this manner, the 3-dimensional measuring device 1A according to this comparative example splits a portion of the range-finding light 35 emitted from the range-finding light source unit 31 using the third beam splitter 55 and controls opening/closing of the first and second shutters 53 and 54. In this way, the internal reference light 36 is acquired. The details of the opening/closing control of the first and second shutters 53 and 54 will be described later. In the 3-dimensional measuring device 1A according to this comparative example, since the range-finding light 35 and the internal reference light 36 cannot be processed simultaneously, a switching operation of the first and second shutters 53 and 54 is necessary. Moreover, when the distance between the 3-dimensional measuring device 1A and the measurement target is short, it is not possible to split the range-finding light 35 and the internal reference light 36 unless a switching operation of the first and second shutters 53 and 54 is performed. However, in the 3-dimensional measuring device 1A according to this comparative example, it is difficult to perform a shutter switching operation at a high speed and it takes a considerable time in adjustment of an optical axis.

In contrast, in the 3-dimensional measuring device 1 according to the present embodiment, as illustrated in FIGS. 1 and 3, the reference light optical system 24 is provided in a range outside the measuring range within the radiation range of the range-finding light 35 and receives the range-finding light 35, reflected from the scanning mirror 7, as the internal reference light 36 and reflects the same. Moreover, the reference light optical system 24 can change the quantity of the reflected internal reference light 36.

Specifically, the reference light optical system 24 includes a motor 241, a density gradient filter 243, a reflecting sheet 244, and a filter 245. The motor 241 has a shaft 242 and generates rotating force. The density gradient filter 243 is supported by the shaft 242 of the motor 241 and is provided to be rotatable about the shaft 242 of the motor 241 with the rotating force transmitted from the motor 241. An optical density of the density gradient filter 243 changes in a circumferential direction. In other words, a density gradient in which the optical density changes in the circumferential direction is provided in the density gradient filter 243. The optical density of the density gradient filter 243 may not necessary increase or decrease gradually in the circumferential direction but may change in the circumferential direction. When the density gradient filter 243 rotates with the rotating force transmitted from the motor 241, the optical density of a region in which the internal reference light 36 passes through the density gradient filter 243 changes. Due to this, the transmittance of the internal reference light 36 with respect to the density gradient filter 243 is variable. The density gradient filter 243 of the present embodiment is one example of a density variable filter 246 (see FIG. 7) capable of changing the optical density of the region through which the internal reference light 36 passes.

The reflecting sheet 244 is provided on the opposite side of the scanning mirror 7 when seen from the density gradient filter 243 and reflects the range-finding light 35 having passed through the density gradient filter 243. In this case, the reflecting sheet 244 causes retroreflection of the internal reference light 36. In this way, adjustment of an optical axis is not necessary unlike a case in which a prism or a mirror reflects the internal reference light 36. Due to this, it is possible to eliminate the time and effort taken in adjustment of an optical axis.

The filter 245 is provided between the scanning mirror 7 and the density gradient filter 243 and is formed of glass or the like, for example. The filter 245 can adjust a variation in a light quantity of the internal reference light 36 resulting from a fluctuation of the 3-dimensional measuring device 1. Moreover, the filter 245 can suppress the internal reference light 36 from reflecting from the surface of the density gradient filter 243. The filter 245 may not necessarily be provided.

The range-finding light 35 which has been reflected from the scanning mirror 7 and has passed through the filter 245 and the density gradient filter 243 is reflected from the reflecting sheet 244. The internal reference light 36 reflected from the reflecting sheet 244 passes through the density gradient filter 243 and the filter 245 and is reflected from the scanning mirror 7. When the internal reference light 36 passes through the density gradient filter 243, the optical density of a region in which the internal reference light 36 passes through the density gradient filter 243 changes. That is, when the internal reference light 36 passes through the density gradient filter 243, the transmittance of the internal reference light 36 with respect to the density gradient filter 243 changes. In this way, internal reference lights 36 having different light quantities are guided to and acquired by the scanning mirror 7. The internal reference light 36 reflected from the scanning mirror 7 passes through the second beam splitter 39 and is guided to the light receiving element 42.

According to the 3-dimensional measuring device 1 according to the present embodiment, the reference light optical system 24 is provided in a range outside the measuring range within the radiation range. Due to this, it is not necessary to provide a shutter (for example, the first and second shutters 53 and 54) that switches between an optical path for radiating the range-finding light 35 to the measurement target and receiving the reflection range-finding light 37 reflected from the measurement target using the light receiving element 42 and an optical path for receiving a portion of the range-finding light 35 split by an optical member (for example, the third beam splitter 55) using the light receiving element 42 as the internal reference light 36. In this way, it is possible to eliminate a shutter's switching operation.

Moreover, the reference light optical system 24 can changes the light quantity of the reflected internal reference light 36. That is, the light quantity of the internal reference light 36 does not change depending on the radiation direction (a scanning direction) of the range-finding light 35 but can be changed by the reference light optical system 24. Due to this, it is possible to acquire internal reference lights 36 having different light quantities using the reference light optical system 24 while suppressing a radiation range (a scanning range) of the range-finding light 35 for acquiring the internal reference light 36. In this way, it is possible to suppress the measuring range from narrowing and to secure a relatively wide measuring range.

Specifically, as described above, the optical density of the density gradient filter 243 changes in the circumferential direction. When the density gradient filter 243 rotates with the rotating force transmitted from the motor 241, the optical density of the region in which the internal reference light 36 passes through the density gradient filter 243 changes. Due to this, the transmittance of the internal reference light 36 with respect to the density gradient filter 243 is variable. When the density gradient filter 243 in which a gradient of the optical density is provided rotates, it is possible to acquire the internal reference lights 36 having different light quantities while suppressing the radiation range (the scanning range) of the range-finding light 35 for acquiring the internal reference light 36. In this way, it is possible to suppress the measuring range from narrowing and to secure a relatively wide measuring range.

Figure 5:
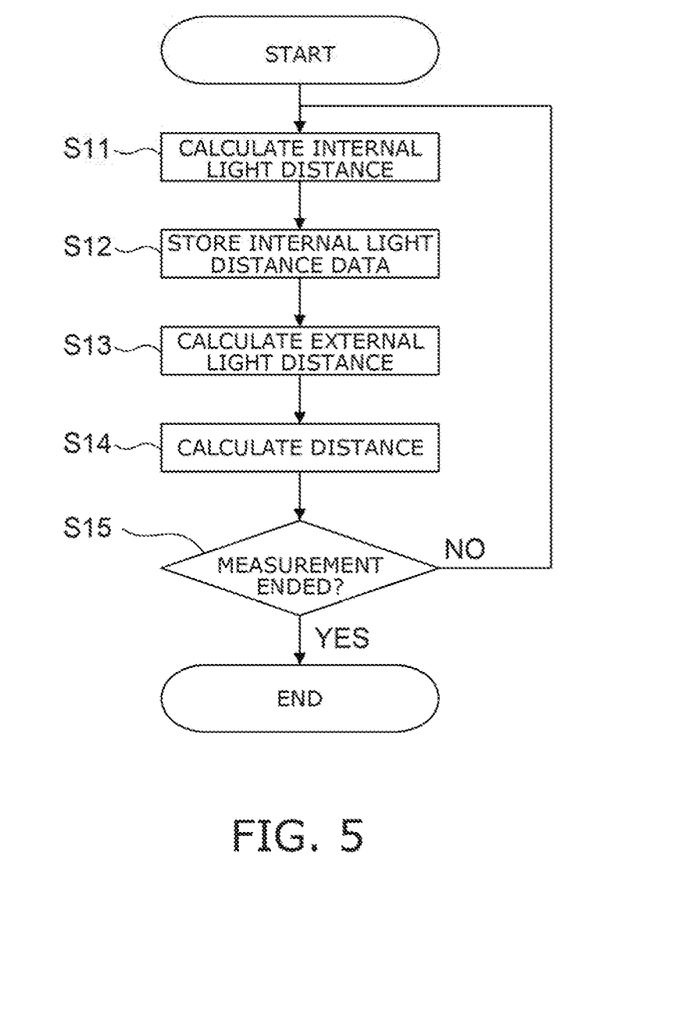
FIG. 5 is a flowchart illustrating a distance calculation process of the 3-dimensional measuring device according to the present embodiment.
Figure 6:
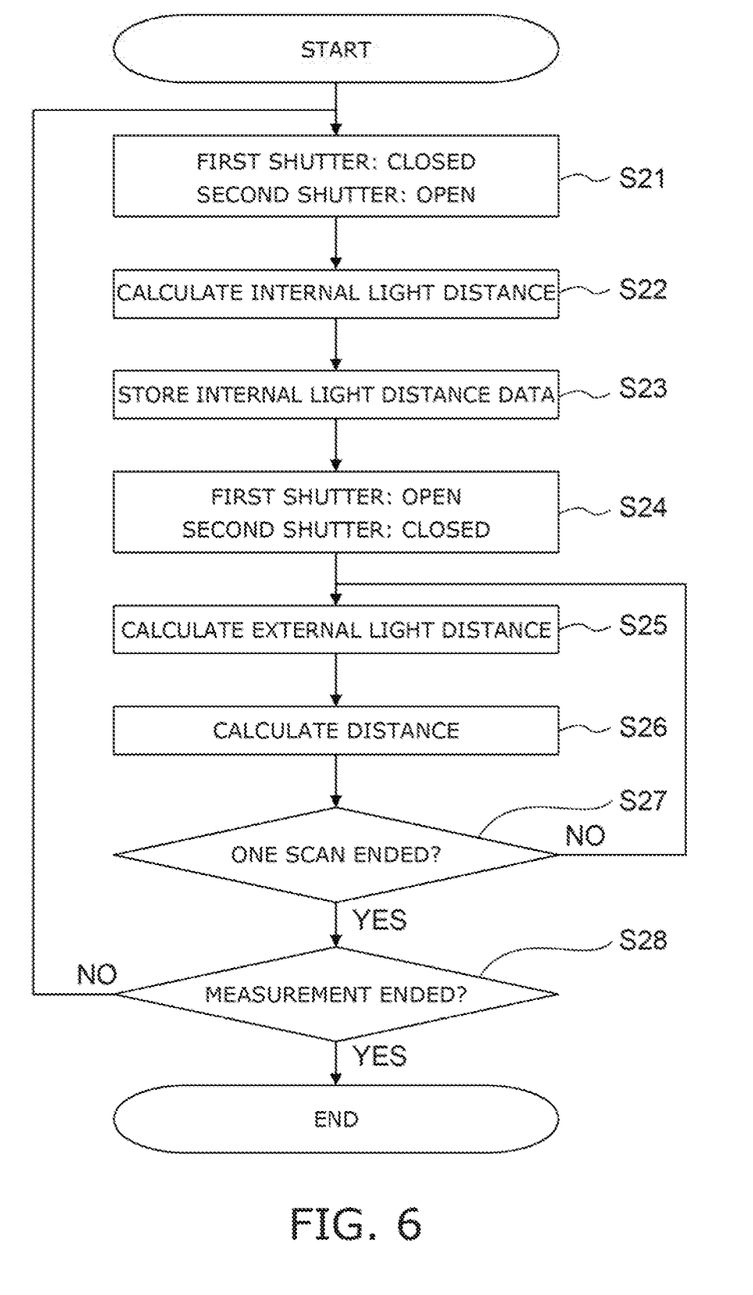
FIG. 6 is a flowchart illustrating a distance calculation process of the 3-dimensional measuring device according to the comparative example.

Next, a process of calculating (measuring) the distance to the measurement target will be described with reference to the drawings. FIG. 5 is a flowchart illustrating a distance calculation process of the 3-dimensional measuring device according to the present embodiment. FIG. 6 is a flowchart illustrating a distance calculation process of the 3-dimensional measuring device according to this comparative example.

First, a distance calculation process of the 3-dimensional measuring device 1A according to this comparative example will be described with reference to FIG. 6. The configuration of main components of the 3-dimensional measuring device 1A according to this comparative example is the same as that described with reference to FIG. 4.

First, in step S21, the control operation unit 15 executes control so that the first shutter 53 is closed and the second shutter 54 is open. In this way, the range-finding light 35 having passed through the third beam splitter 55 is blocked by the first shutter 53. On the other hand, the range-finding light 35 having been reflected from the third beam splitter 55 passes through the second shutter 54, the density gradient filter 243, and the lens 57 as the internal reference light 36 and is reflected from the fourth beam splitter 56 and is guided to the light receiving element 42.

Subsequently, in step S22, the distance data processing unit 51 calculates an internal light distance on the basis of the internal reference light (an internal light) 36 received by the light receiving element 42. That is, the distance data processing unit 51 processes internal light distance data on the basis of the internal reference light 36 received by the light receiving element 42 and converted to an electrical signal of the internal reference light. Subsequently, in step S23, the storage unit 48 stores the intrinsic optical distance data.

Subsequently, in step S24, the control operation unit 15 executes control so that the first shutter 53 is open and the second shutter 54 is closed. In this way, the range-finding light 35 having passed through the third beam splitter 55 passes through the first shutter 53 and is sequentially reflected from the first beam splitter 38 and the second beam splitter 39 and is guided to the scanning mirror 7. The range-finding light 35 is reflected from the scanning mirror 7 and is radiated to the measurement target. On the other hand, the range-finding light 35 reflected from the third beam splitter 55 is blocked by the second shutter 54 as the internal reference light 36.

The processing order of step S24 may not necessarily be later than step S23. For example, the process of step S24 may be executed between steps S21 and S22 or between steps S22 and S23. A shutter response time (including a stabilization time) of each of the first and second shutters 53 and 54 is approximately 100 milliseconds (ms) or more and approximately 200 ms or smaller, for example. Due to this, the sum of the processing time of step S21 and the processing time of step S24 is approximately 200 ms or more and approximately 400 ms or smaller, for example.

In step S25 subsequent to step S24, the distance data processing unit 51 calculates an external light distance on the basis of the reflection range-finding light (an external light) 37 received by the light receiving element 42. That is, the distance data processing unit 51 processes an external light distance data on the basis of the reflection range-finding light 37 received by the light receiving element 42 and converted to an electrical signal of the reflection range-finding light. Subsequently, in step S26, the distance data processing unit 51 calculates the distance to the measurement target on the basis of the internal light distance data and the external light distance data stored in the storage unit 48.

Subsequently, in step S27, the control operation unit 15 determines whether one scanning operation has ended. When one scanning operation has not ended (step S27: NO), the control operation unit 15 executes the above-described process of step S25. That is, the control operation unit 15 acquires the point cloud data for the entire measuring range or the point cloud data for the measurement target in the measurement of one scanning operation. For example, the control operation unit 15 determines that one scanning operation has ended when a predetermined period has elapsed from the start of measurement. Alternatively, for example, the control operation unit 15 determines that one scanning operation has ended when a change in temperature is a predetermined value or more. That is, the control operation unit 15 determines that one scanning operation has ended when an element which changes the internal reference light 36 is present. In this manner, the end of one scanning operation is not limited to a fact that the scanning mirror 7 makes one rotation about the vertical rotating shaft 6. The period in which the scanning mirror 7 makes one rotation about the vertical rotating shaft 6 is approximately 30 ms.

On the other hand, when one scanning operation has ended (step S27: YES), the control operation unit 15 determines whether the measurement has ended in step S28. When the measurement has not ended (step S28: NO), the control operation unit 15 executes the above process of step S21. That is, when an element that changes the internal reference light 36 is present, the control operation unit 15 executes control so that the first shutter 53 is closed and the second shutter 54 is open (step S21). The distance data processing unit 51 calculates the internal light distance on the basis of the internal reference light (an internal light) 36 received by the light receiving element 42 (step S22). That is, whenever one scanning operation ends, the distance data processing unit 51 processes (acquires) internal light distance data.

On the other hand, when measurement has ended (step S28: YES), the control operation unit 15 ends the distance calculation process.

In this manner, the 3-dimensional measuring device 1A according to this comparative example performs control to open and close the first and second shutters 53 and 54. However, in the 3-dimensional measuring device 1A according to this comparative example, it is difficult to perform the switching operation of switching the first and second shutters 53 and 54 at a high speed and it takes a considerable time in adjustment of an optical axis.

In contrast, in the 3-dimensional measuring device 1 according to the present embodiment, as described with reference to FIG. 3, the reference light optical system 24 is provided in a range outside the measuring range within the radiation range of the range-finding light 35 and receives the range-finding light 35, reflected from the scanning mirror 7, as the internal reference light 36 and reflects the same. Therefore, in the 3-dimensional measuring device 1 according to the present embodiment, first, in step S11, the control operation unit 15 controls the scanning mirror 7 to radiate the range-finding light 35 to a range outside the measuring range within the radiation range. That is, the control operation unit 15 controls the scanning mirror 7 to radiate the range-finding light 35 to the reference light optical system 24 as the internal reference light 36.

The internal reference light 36 having been received and reflected by the reference light optical system 24 is reflected from the scanning mirror 7 and passes through the second beam splitter 39 and is guided to the light receiving element 42. The distance data processing unit 51 calculates the internal light distance on the basis of the internal reference light (an internal light) 36 received by the light receiving element 42. That is, the distance data processing unit 51 processes internal light distance data on the basis of the internal reference light 36 received by the light receiving element 42 and converted to an electrical signal of the internal reference light. Subsequently, in step S12, the storage unit 48 stores the intrinsic optical distance data.

Subsequently, in step S13, the control operation unit 15 controls the scanning mirror 7 to radiate the range-finding light 35 to a measuring range within the radiation range. That is, the control operation unit 15 controls the scanning mirror 7 to radiate the range-finding light 35 to the measurement target. The reflection range-finding light 37 reflected from the measurement target present in the measuring range is reflected from the scanning mirror 7 and passes through the second beam splitter 39 and is guided to the range finding unit 22. The distance data processing unit 51 calculates an external light distance on the basis of the reflection range-finding light (an external light) 37 received by the light receiving element 42. That is, the distance data processing unit 51 processes external light distance data on the basis of the reflection range-finding light 37 received by the light receiving element 42 and converted to an electrical signal of the reflection range-finding light.

Subsequently, in step S14, the distance data processing unit 51 calculates the distance to the measurement target on the basis of the internal light distance data and the external light distance data stored in the storage unit 48. Subsequently, the control operation unit 15 determines whether the measurement has ended in step S15. When the measurement has not ended (step S15: NO), the control operation unit 15 executes the above process of step S11. That is, when the measurement has not ended (step S15: NO), the control operation unit 15 controls the scanning mirror 7 to radiate the range-finding light 35 to the reference light optical system 24 as the internal reference light 36 regardless of whether one scanning operation has ended (whether an element that changes the internal reference light 36 is present). That is, the distance data processing unit 51 calculates the distance to the measurement target (step S14), and when the measurement has not ended (step S15: NO), the distance data processing unit 51 processes (acquires) the internal light distance data whenever the distance calculation ends.

In step S15 subsequent to step S14, when the measurement has ended (step S15: YES), the control operation unit 15 ends the distance calculation process.

In this manner, in the 3-dimensional measuring device 1 according to the present embodiment, the control operation unit 15 does not control opening and closing of the first and second shutters 53 and 54 whenever one scanning operation ends. In the 3-dimensional measuring device 1 according to the present embodiment, the distance data processing unit 51 processes (acquires) internal light distance data whenever the distance calculation ends. In this way, it is possible to eliminate a shutter's switching operation. Moreover, the light quantity of the internal reference light 36 does not change depending on the radiation direction (a scanning direction) of the range-finding light 35 but can be changed by the reference light optical system 24. This is the same as that described with reference to FIG. 3. Due to this, it is possible to acquire internal reference lights 36 having different light quantities using the reference light optical system 24 while suppressing a radiation range (a scanning range) of the range-finding light 35 for acquiring the internal reference light 36. In this way, it is possible to suppress the measuring range from narrowing and to secure a relatively wide measuring range.

Next, a modification of the reference light optical system of the present embodiment will be described with reference to the drawings. When the constituent elements of a 3-dimensional measuring device according to a modification are similar to the constituent elements of the 3-dimensional measuring device according to the present embodiment described with reference to FIGS. 1 to 3, redundant description thereof will be omitted appropriately, and the difference will be mainly described.

Figure 7:
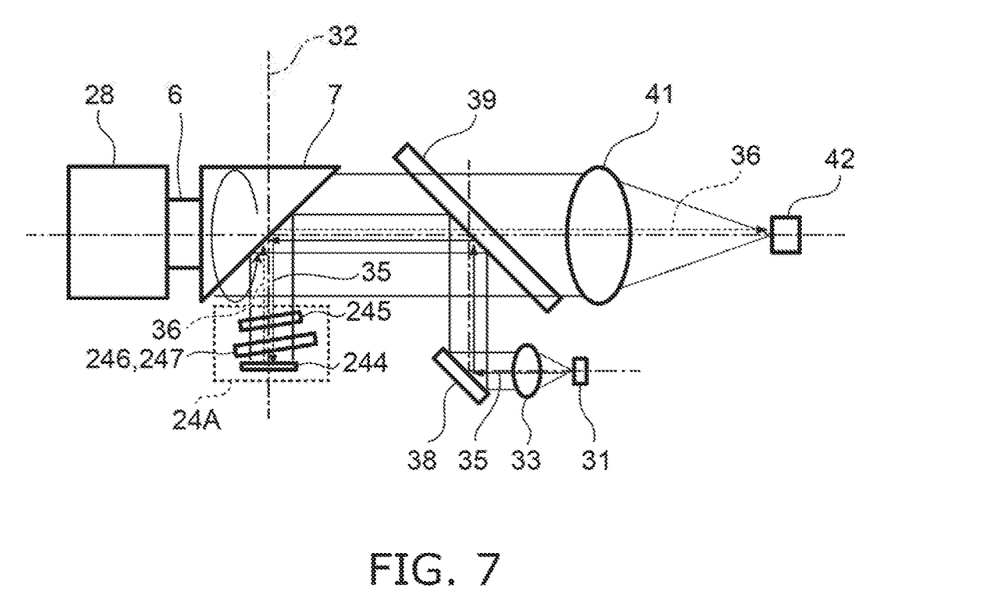
FIG. 7 is a diagram illustrating a first modification of the reference light optical system of the present embodiment.

FIG. 7 is a diagram illustrating a first modification of the reference light optical system of the present embodiment. A reference light optical system 24A of this modification includes a density variable filter 246, a reflecting sheet 244, and a filter 245. The reflecting sheet 244 and the filter 245 are the same as those described with reference to FIG. 3. The density variable filter 246 is provided between the filter 245 and the reflecting sheet 244. The reference light optical system 24A of this modification is different from the reference light optical system 24 described with reference to FIGS. 1 and 3 in that the density variable filter 246 is provided rather than the motor 241 and the density gradient filter 243.

The density variable filter 246 can change the optical density of a region through which the internal reference light 36 passes. Due to this, the transmittance of the internal reference light 36 with respect to the density variable filter 246 is variable. That is, the density gradient filter 243 described with reference to FIG. 3 is one example of the density variable filter 246 of this modification. The configuration of the other main components is similar to that of the reference light optical system 24 described with reference to FIGS. 1 and 3.

The internal reference light 36 having been reflected from the scanning mirror 7 and having passed through the filter 245 and the density variable filter 246 is reflected from the reflecting sheet 244. The internal reference light 36 reflected from the reflecting sheet 244 passes through the density variable filter 246 and the filter 245 and is reflected from the scanning mirror 7. When the internal reference light 36 passes through the density variable filter 246, the optical density of a region in which the internal reference light 36 passes through the density variable filter 246 changes. That is, when the internal reference light 36 passes through the density variable filter 246, the transmittance of the internal reference light 36 with respect to the density variable filter 246 changes. In this way, the internal reference lights 36 having different light quantities are guided to and acquired by the scanning mirror 7. The internal reference light 36 reflected from the scanning mirror 7 passes through the second beam splitter 39 and is guided to the light receiving element 42.

According to this configuration, since the transmittance of the internal reference light 36 with respect to the density variable filter 246 is variable, it is possible to acquire internal reference lights 36 having different light quantities using the reference light optical system 24A while suppressing a radiation range (a scanning range) of the range-finding light 35 for acquiring the internal reference light 36. In this way, it is possible to suppress the measuring range from narrowing and to secure a relatively wide measuring range.

The reference light optical system 24A of this modification may have a transmittance variable filter 247 instead of the density variable filter 246. The transmittance variable filter 247 is provided between the filter 245 and the reflecting sheet 244 and can change the transmittance of the internal reference light 36. That is, the transmittance of the internal reference light 36 with respect to the transmittance variable filter 247 is variable. An example of the transmittance variable filter 247 is a liquid crystal panel capable of changing a transmittance according to a received electrical signal.

The internal reference light 36 having been reflected from the scanning mirror 7 and having passed through the filter 245 and the transmittance variable filter 247 is reflected from the reflecting sheet 244. The internal reference light 36 reflected from the reflecting sheet 244 passes through the transmittance variable filter 247 and the filter 245 and is reflected from the scanning mirror 7. When the internal reference light 36 passes through the transmittance variable filter 247, the transmittance of the internal reference light 36 with respect to the transmittance variable filter 247 changes. In this way, internal reference lights 36 having different light quantities are guided to and acquired by the scanning mirror 7. The internal reference light 36 reflected from the scanning mirror 7 passes through the second beam splitter 39 and is guided to the light receiving element 42.

According to this configuration, since the transmittance of the internal reference light 36 with respect to the transmittance variable filter 247 is variable, it is possible to acquire internal reference lights 36 having different light quantities using the reference light optical system 24A while suppressing a radiation range (a scanning range) of the range-finding light 35 for acquiring the internal reference light 36. In this way, it is possible to suppress the measuring range from narrowing and to secure a relatively wide measuring range.

Figure 8:
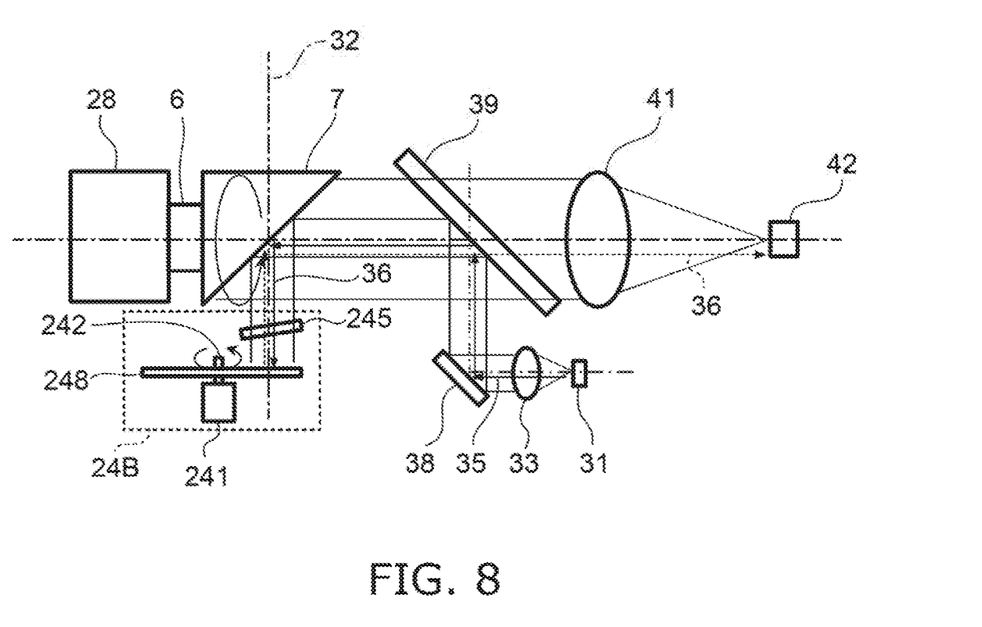
FIG. 8 is a diagram illustrating a second modification of the reference light optical system of the present embodiment.

FIG. 8 is a diagram illustrating a second modification of the reference light optical system of the present embodiment. A reference light optical system 24B of this modification includes a motor 241, a reflectance gradient sheet 248, and a filter 245. The motor 241 and the filter 245 are the same as those described with reference to FIG. 3. The reference light optical system 24B of this modification is different from the reference light optical system 24 described with reference to FIGS. 1 and 3 in that the reflectance gradient sheet 248 is provided rather than the density gradient filter 243 and the reflecting sheet 244.

The reflectance gradient sheet 248 is supported by the shaft 242 of the motor 241 and is provided rotatable about the shaft 242 of the motor 241 with the rotating force transmitted from the motor 241. A reflectance of the internal reference light 36 in the reflectance gradient sheet 248 changes in the circumferential direction. In other words, a reflectance gradient in which the reflectance of the internal reference light 36 changes in the circumferential direction is provided in the reflectance gradient sheet 248. The reflectance of the internal reference light 36 in the reflectance gradient sheet 248 may not necessary increase or decrease gradually in the circumferential direction but may change in the circumferential direction.

When the reflectance gradient sheet 248 rotates with the rotating force transmitted from the motor 241, the reflectance of the internal reference light 36 reflected from the reflectance gradient sheet 248 changes. That is, the internal reference light 36 having been reflected from the scanning mirror 7 and having passed through the filter 245 is reflected from the reflectance gradient sheet 248. In this case, since the reflectance gradient sheet 248 is rotating, the reflectance of the internal reference light 36 reflected from the reflectance gradient sheet 248 changes. In this way, internal reference lights 36 having different light quantities are guided to and acquired by the scanning mirror 7. The internal reference light 36 reflected from the scanning mirror 7 passes through the second beam splitter 39 and is guided to the light receiving element 42.

According to this modification, when the reflectance gradient sheet 248 rotates, the reflectance of the internal reference light 36 reflected from the reflectance gradient sheet 248 changes. In this way, it is possible to acquire internal reference lights 36 having different light quantities while suppressing the radiation range (a scanning range) of the range-finding light 35 for acquiring the internal reference light 36. In this way, it is possible to suppress the measuring range from narrowing and to secure a relatively wide measuring range.

Hereinabove, the embodiment of the present invention has been described. However, the present invention is not limited to the above-described embodiment, and various changes can be made without departing from the scope of the claims. The components of the above-described embodiment may be partially omitted or may be arbitrarily combined with each other so as to be different from that described above.

What is claimed is:

1. A 3-dimensional measuring device that radiates a range-finding light to a measurement target, measures a distance to the measurement target on the basis of an internal reference light beam and a reflection range-finding light, which is the range-finding light reflected from the measurement target, and detects a radiation direction of the range-finding light to thereby acquire 3-dimensional data on the measurement target, the 3-dimensional measuring device comprising:
   a light source unit that emits the range-finding light;
   a projection optical system that radiates the range-finding light emitted from the light source unit to a range-finding optical axis;
   a scanning mirror that is provided to be rotatable about a rotating shaft in a state of being inclined with respect to a shaft center of the rotating shaft to radiate the range-finding light guided from the projection optical system within a plane crossing the rotating shaft in a rotary manner;
   a light-receiving optical system that receives the reflection range-finding light having been reflected from the measurement target and guided by the scanning mirror;
   a reference light optical system that is provided in a range outside a measuring range, in which the measurement target is irradiated with the range-finding light within a radiation range in which the range-finding light is radiated by the scanning mirror in a rotary manner, to receive and reflect the range-finding light, reflected from the scanning mirror, as the internal reference light, this reference light optical system being capable of changing a light quantity of the reflected internal reference light; and
   a light receiving element that receives the reflection range-finding light and the internal reference light guided from the reference light optical system.

2. The 3-dimensional measuring device according to claim 1, wherein
   the reference light optical system includes:
   a density variable filter capable of changing an optical density of a region through which the internal reference light passes; and
   a reflecting sheet of retroreflection that reflects the internal reference light having passed through the density variable filter.

3. The 3-dimensional measuring device according to claim 2, wherein
   the reference light optical system further includes a motor that generates rotating force, and
   the density variable filter is a density gradient filter which is provided to be rotatable with the rotating force transmitted from the motor and in which the optical density changes in a circumferential direction.

4. The 3-dimensional measuring device according to claim 1, wherein
   the reference light optical system includes:
   a transmittance variable filter capable of changing a transmittance of the internal reference light; and
   a reflecting sheet of retroreflection that reflects the internal reference light having passed through the transmittance variable filter.

5. The 3-dimensional measuring device according to claim 1, wherein the reference light optical system includes:
   a motor that generates rotating force; and
   a reflectance gradient sheet which is provided to be rotatable with the rotating force transmitted from the motor and in which a reflectance of the internal reference light changes in a circumferential direction.

\* \* \* \* \*

UNITED STATES PATENT AND TRADEMARK OFFICE
CERTIFICATE OF CORRECTION

| | |
|---|---|
| PATENT NO. | : 11,520,015 B2 |
| APPLICATION NO. | : 16/106309 |
| DATED | : December 6, 2022 |
| INVENTOR(S) | : Tanaka et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1143 days.

Signed and Sealed this
Twenty-second Day of October, 2024

Katherine Kelly Vidal
*Director of the United States Patent and Trademark Office*